United States Patent
Lee

(10) Patent No.: US 11,846,948 B2
(45) Date of Patent: Dec. 19, 2023

(54) PATH PLANNING APPARATUS OF ROBOT AND METHOD THEREOF

(71) Applicants: Hyundai Motor Company, Seoul (KR); Kia Corporation, Seoul (KR)

(72) Inventor: Hwan Hee Lee, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/877,381

(22) Filed: Jul. 29, 2022

(65) Prior Publication Data

US 2023/0116484 A1    Apr. 13, 2023

(30) Foreign Application Priority Data

Oct. 8, 2021   (KR) .................. 10-2021-0134358

(51) Int. Cl.
*G05D 1/02*    (2020.01)

(52) U.S. Cl.
CPC ......... *G05D 1/0217* (2013.01); *G05D 1/0214* (2013.01); *G05D 1/0238* (2013.01); *G05D 1/0274* (2013.01)

(58) Field of Classification Search
CPC .. G05D 1/0217; G05D 1/0214; G05D 1/0238; G05D 1/0274; B60W 10/00; B60W 60/00276; B60W 2300/00; B60W 2530/213; B60W 2540/041; B60W 2540/049; B60W 2552/00; B60W 2754/00; B60W 2900/00

See application file for complete search history.

(56) References Cited

U.S. PATENT DOCUMENTS

| 7,447,593 | B2 | 11/2008 | Estkowski et al. |
| 8,666,548 | B2* | 3/2014 | Lim ............ G06Q 10/047 700/250 |
| 8,935,096 | B2* | 1/2015 | Choi ............ G01C 21/3446 701/533 |
| 10,008,110 | B1* | 6/2018 | Herlocker ............ G08G 1/0112 |

(Continued)

FOREIGN PATENT DOCUMENTS

| CN | 108981704 A | 12/2018 |
| JP | 2019074459 A | 5/2019 |

(Continued)

OTHER PUBLICATIONS

Lee, Hwanhee, et al., "Fast, Lightweight, and Robust Path Planning for Low-power Embedded Environments", 2021 The 21st International Conference on Control, Automation and Systems, Jeju, Korea, Oct. 12-15, 2021, 6 pages.

*Primary Examiner* — Andrew Joseph Rudy
(74) *Attorney, Agent, or Firm* — Slater Matsil, LLP

(57) ABSTRACT

An embodiment path planning apparatus includes a sensing device configured to detect obstacles in an electronic map stored in a memory, wherein a location of a robot and a destination are marked on the electronic map, and a controller configured to independently generate a robot tree in which the location of the robot is a first root node and a destination tree in which the destination is a second root node, in consideration of the obstacles in the electronic map, to search for an initial path based on the robot tree and the destination tree, and to optimize the initial path such that a final path from the location of the robot to the destination has a shortest distance.

20 Claims, 14 Drawing Sheets

(56) References Cited

U.S. PATENT DOCUMENTS

| | | | |
|---|---|---|---|
| 10,278,333 B2 * | 5/2019 | Shen | G05D 1/0011 |
| 10,365,110 B2 | 7/2019 | Alesiani | |
| 10,369,695 B2 | 8/2019 | Lee | |
| 11,256,270 B2 * | 2/2022 | Chopra | H04W 4/44 |
| 11,468,285 B1 * | 10/2022 | Tang | B60W 60/0027 |
| 2010/0174435 A1 | 7/2010 | Lim | |
| 2012/0245817 A1 * | 9/2012 | Cooprider | B60W 30/143 |
| | | | 701/1 |
| 2014/0025201 A1 | 1/2014 | Ryu et al. | |
| 2022/0316885 A1 * | 10/2022 | Chi | G05D 1/0214 |
| 2022/0343138 A1 * | 10/2022 | Tang | H04N 23/695 |

FOREIGN PATENT DOCUMENTS

| | | |
|---|---|---|
| KR | 101339480 B1 | 12/2013 |
| KR | 101554515 B1 | 9/2015 |

* cited by examiner

PATH PLANNING APPARATUS OF ROBOT AND METHOD THEREOF

CROSS-REFERENCE TO RELATED APPLICATIONS

This application claims the benefit of Korean Patent Application No. 10-2021-0134358, filed on Oct. 8, 2021, which application is hereby incorporated herein by reference.

TECHNICAL FIELD

The present disclosure relates to a path planning apparatus of a robot and a method thereof.

BACKGROUND

Robots are devices that automatically perform a specific task or operation, and are used to replace or assist humans in various fields. The types of robots include humanoid robots, mobile robots, industrial robots, surgical robots, and the like.

It is important to control motions of the robot so as to perform a task or service given to the robot. Techniques for handling robot motions are basically based on path planning algorithms. In the field of robotics, the term "path planning" is also referred to as motion planning.

In the path planning algorithms, a RRT (Rapidly-Exploring Random Tree) algorithm is generally used in situations with high degrees of freedom or complex constraints. This RRT algorithm builds a data structure (tree) using a random search in a configuration space.

In detail, the RRT algorithm is an algorithm in which the configuration of a robot or its parts in the configuration space is visualized as a tree (T) modeled as a single point, and is an algorithm which finds a path that satisfies the constraints from the initial configuration (a location of the robot) to the final configuration (a destination). In this case, an extension of the tree T may be a repetition of processes of determining the closest node among nodes belonging to the tree (T) in the randomly sampled configuration in the configuration space, and of designating a new node separated by a specific distance from the closest node.

On the other hand, the conventional technique for planning the path of a robot cannot quickly search for the initial path of the robot because generating a single tree in which a location of the robot is a root node and searching for the path of the robot based on this. In addition, since the path optimization process is dependent on the tree generation process, the degree of path optimization depends on the number of iterations of the tree generation process, and thus the initial path of the robot cannot be quickly optimized.

Descriptions in this background section are provided to enhance understanding of the background of the disclosure, and may include descriptions other than those of the prior art already known to those of ordinary skill in the art to which this technology belongs.

SUMMARY

The present disclosure relates to a path planning apparatus of a robot and a method thereof. Particular embodiments relate to a technology that plans an optimal path of a mobile robot based on a rapidly-exploring random tree (RRT) algorithm.

Embodiments of the present disclosure can solve problems occurring in the prior art while advantages achieved by the prior art are maintained intact.

An embodiment of the present disclosure provides a path planning apparatus and method for a robot that may not only quickly search for an initial path, but may also quickly optimize the initial path by independently generating a robot tree in which the location of the robot is a root node and a destination tree in which the destination is a root node, searching for the initial path based on the robot tree and the destination tree, and optimizing the initial path such that a path from the location of the robot to the destination becomes a shortest distance.

The technical problems solvable by embodiments of the present disclosure are not limited to the aforementioned problems, and any other technical problems not mentioned herein will be clearly understood from the following description by those skilled in the art to which the present disclosure pertains. In addition, it will be easily understood that the objects and advantages of embodiments of the disclosure are realized by means and combinations described in the appended claims.

According to an embodiment of the present disclosure, a path planning apparatus comprising a sensing device configured to detect obstacles in an electronic map stored in a memory, wherein a location of a robot and a destination are marked on the electronic map, and a controller configured to independently generate a robot tree in which the location of the robot is a first root node and a destination tree in which the destination is a second root node, in consideration of the obstacles in the electronic map, to search for an initial path based on the robot tree and the destination tree, and to optimize the initial path such that a final path from the location of the robot to the destination has a shortest distance.

According to an embodiment, the controller is configured to sample nodes that do not overlap the obstacles in the electronic map.

According to an embodiment, the controller is configured to generate the robot tree by using a node that prevents a collision with the obstacles while the robot is moving.

According to an embodiment, the controller is configured to generate the destination tree by using a node that prevents a collision with the obstacles while the robot is moving.

According to an embodiment, the controller is configured to sample the nodes until a common node connecting the robot tree to the destination tree is sampled.

According to an embodiment, the controller is configured to search for the initial path from the location of the robot to the destination when the robot tree is connected to the destination tree.

According to an embodiment, the controller is configured to divide the initial path in units of segments after interpolating the initial path at specific intervals, and optimize the initial path based on a relationship between nodes between each segment and the obstacles.

According to an embodiment, the controller is configured to optimize the initial path until all lines connecting the nodes between each segment overlap the obstacles.

According to an embodiment, the controller is configured to generate a plurality of nodes by interpolating the initial path at the specific intervals, detect two nodes with an earliest order among pairs of nodes in which lines connecting the two nodes do not overlap the obstacles by performing a process of sequentially connecting from a destination node to a next node of a robot node with the robot node as a starting point to a previous node of the destination node, and designate the two nodes with the earliest order and all nodes between the two nodes as a first segment and designate remaining nodes as a second segment.

According to an embodiment, the controller is configured to connect the nodes included in the first segment in ascending order to the nodes included in the second segment in descending order, respectively, when the nodes included in the first segment are connected to the nodes included in the second segment based on the first segment to detect a first node and a second node with an earliest order among pairs of nodes in which the line connecting the first node and the second node does not overlap the obstacles, and designate from a start node of the first segment to the first node as a third segment, designate from the first node to the second node as a fourth segment, designate from the second node to a last node as a fifth segment, sequentially number nodes in the fourth segment, and sequentially number nodes in the fifth segment.

According to an embodiment of the present disclosure, a method comprising detecting, by a sensing device, obstacles in an electronic map on which a location of a robot and a destination are marked, generating, by a controller, a robot tree in which the location of the robot is a root node, in consideration of the obstacles in the electronic map, generating, by the controller, a destination tree in which the destination is a root node 1n consideration of the obstacles in the electronic map, the robot tree and the destination tree being generated independently of each other, searching, by the controller, for an initial path based on the robot tree and the destination tree, and optimizing, by the controller, the initial path such that a final path from the location of the robot to the destination has a shortest distance.

According to an embodiment, the generating the robot tree and generating the destination tree comprise sampling, by the controller, nodes that do not overlap the obstacles in the electronic map.

According to an embodiment, the generating the robot tree comprises using, by the controller, a node that prevents a collision with the obstacles while the robot is moving.

According to an embodiment, the generating the destination tree comprises using, by the controller, a node that prevents a collision with the obstacles while the robot is moving.

According to an embodiment, the sampling the nodes comprises sampling, by the controller, a common node connecting the robot tree to the destination tree.

According to an embodiment, the searching for the initial path comprises searching, by the controller, for the initial path from the location of the robot to the destination when the robot tree is connected to the destination tree.

According to an embodiment, the optimizing of the initial path comprises dividing, by the controller, the initial path in units of segments after interpolating the initial path at specific intervals, optimizing, by the controller, the initial path based on a relationship between nodes between each segment and the obstacles, and completing, by the controller, optimizing the initial path when all lines connecting the nodes between each segment overlap the obstacles.

According to an embodiment of the present disclosure, a method further comprising causing, by the controller, the robot to move to the destination along the final path.

According to an embodiment of the present disclosure, a robot comprising a robot body, a memory device, a sensing device coupled to the robot body and configured to detect obstacles in an electronic map stored in the memory device, wherein a location of the robot and a destination are marked on the electronic map, and a controller comprising a sampler, a robot tree generator, a destination tree generator, a tree connection determinator, an initial path searcher, and a path optimizer, wherein the controller is configured to independently generate a robot tree in which the location of the robot is a first root node and a destination tree in which the destination is a second root node, in consideration of the obstacles in the electronic map, search for an initial path based on the robot tree and the destination tree, and optimize the initial path such that a final path from the location of the robot to the destination is a path having a shortest distance. Wherein the sampler is configured to sample nodes that do not overlap the obstacles in the electronic map, and the robot tree generator is configured to generate the robot tree and the destination tree generator is configured to generate the destination tree using nodes that prevent a collision with the obstacles while the robot is moving.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
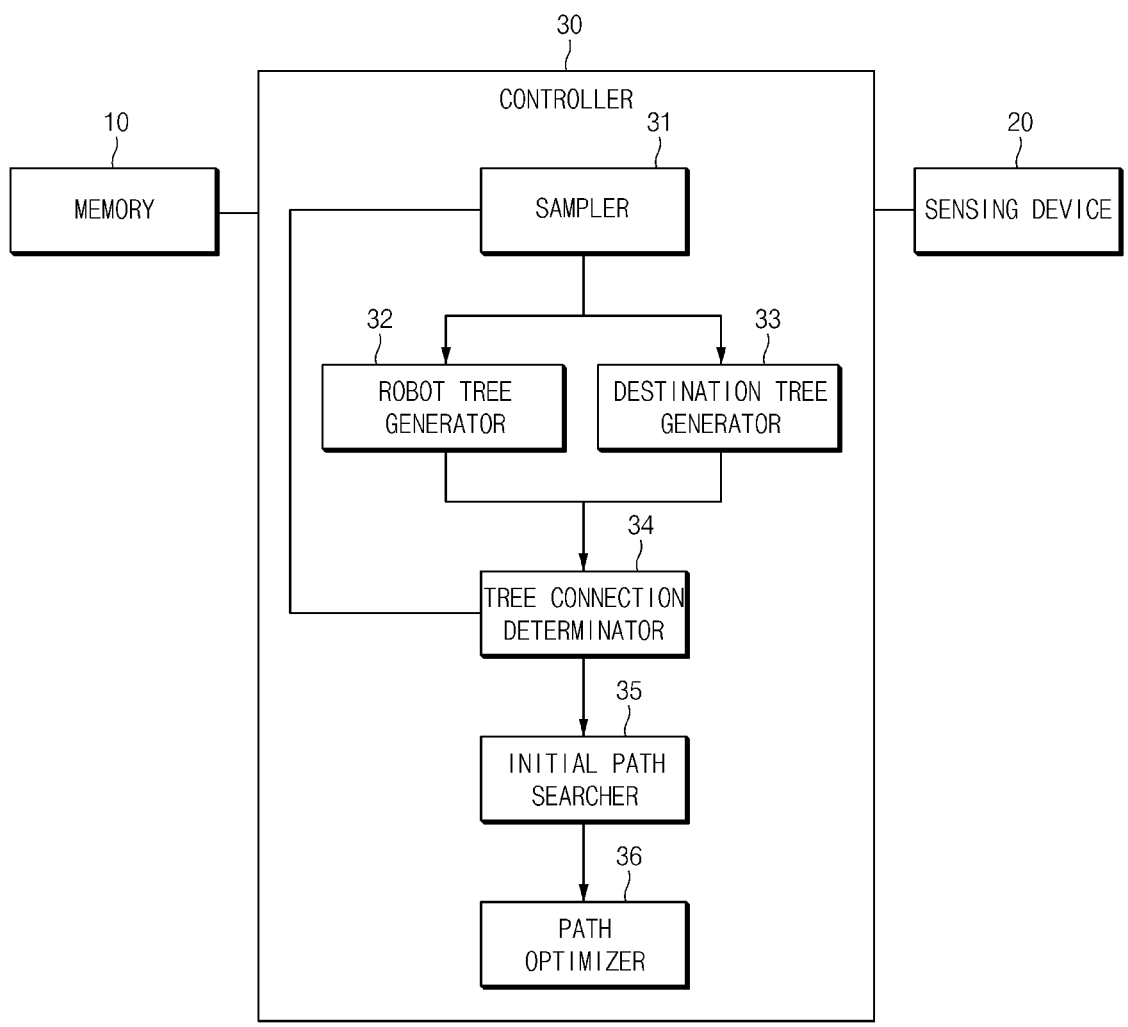
FIG. 1 is a diagram illustrating a configuration of a path planning apparatus of a robot, according to an embodiment of the present disclosure.

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a configuration of a path planning apparatus of a robot, according to an embodiment of the present disclosure.

As illustrated in FIG. 1, a path planning apparatus of a robot according to an embodiment of the present disclosure may include a memory (i.e., a storage) 10, a sensing device 20, and a controller 30. In this case, according to a method of implementing the path planning apparatus of the robot, according to an embodiment of the present disclosure, each component may be combined with each other to be implemented as one, or some components may be omitted. In particular, functions of the controller 30 may be performed by a processor.

Referring to each of the components, first, the memory 10 may store various logics, algorithms, and programs required in processes of independently generating a robot tree in which the location of the robot is a root node and a destination tree in which the destination is a root node, searching for the initial path based on the robot tree and the destination tree, and optimizing the initial path such that a path from the location of the robot to the destination becomes a shortest distance.

The memory 10 may store an RRT algorithm used to generate the robot tree and the destination tree.

The memory 10 may store an electronic map including a current location of the robot and a destination.

The memory 10 may include at least one type of storage medium of a memory such as a flash memory type, a hard disk type, a micro type, and a card type (e.g., an SD card (Secure Digital Card) or an XD card (eXtream Digital Card)), and a memory such as a RAM (Random Access Memory), an SRAM (Static RAM), a ROM (Read-Only Memory), a PROM (Programmable ROM), an EEPROM (Electrically Erasable PROM), an MRAM (magnetic RAM), a magnetic disk, and optical disk type memory.

The sensing device 20 is a set of sensors mounted on the robot, and may include a camera, an ultrasonic sensor, a LiDAR (Light Detection and Ranging) sensor, or the like to detect obstacles in an area including a current location of the robot and a destination.

The controller 30 may perform overall control such that each of the components may perform their functions normally. The controller 30 may be implemented in the form of hardware, or may be implemented in the form of software, or may be implemented in the form of a combination of hardware and software. Preferably, the controller 30 may be implemented as a microprocessor, but is not limited thereto.

In particular, the controller 30 may directly perform processes of independently generating a robot tree in which the location of the robot is a root node and a destination tree in which the destination is a root node, searching for the initial path based on the robot tree and the destination tree, and optimizing the initial path such that a path from the location of the robot to the destination becomes a shortest distance, or may perform various controls accompanying them.

In this case, the controller 30 may generate the robot tree and the destination tree in consideration of only whether or not the robot collides with the obstacles. That is, the controller 30 may independently generate the robot tree and the destination tree by using nodes that prevent the robot from colliding with obstacles while the robot moves to its destination. In addition, the controller 30 may quickly optimize the initial path by separately performing a path optimization process after the tree is generated, rather than in a method of simultaneously performing the tree generation process and the path optimization process. In addition, the controller 30 may quickly search for the initial path by searching for the initial path based on dual trees generated independently of each other, rather than using a method of searching for the initial path based on a single tree.

The controller 30 may include a sampler 31, a robot tree generator 32, a destination tree generator 33, a tree connection determinator 34, an initial path searcher 35, and a path optimizer 36, but this is a subdivided function of the controller 30, and all functions of each block may be performed by the controller 30.

Hereinafter, with reference to FIGS. 2 to 6, among the detailed configurations of the controller 30, operations of the sampler 31, the robot tree generator 32, the destination tree generator 33, the tree connection determinator 34, and the initial path searcher 35 will be described in detail.

Figure 2:
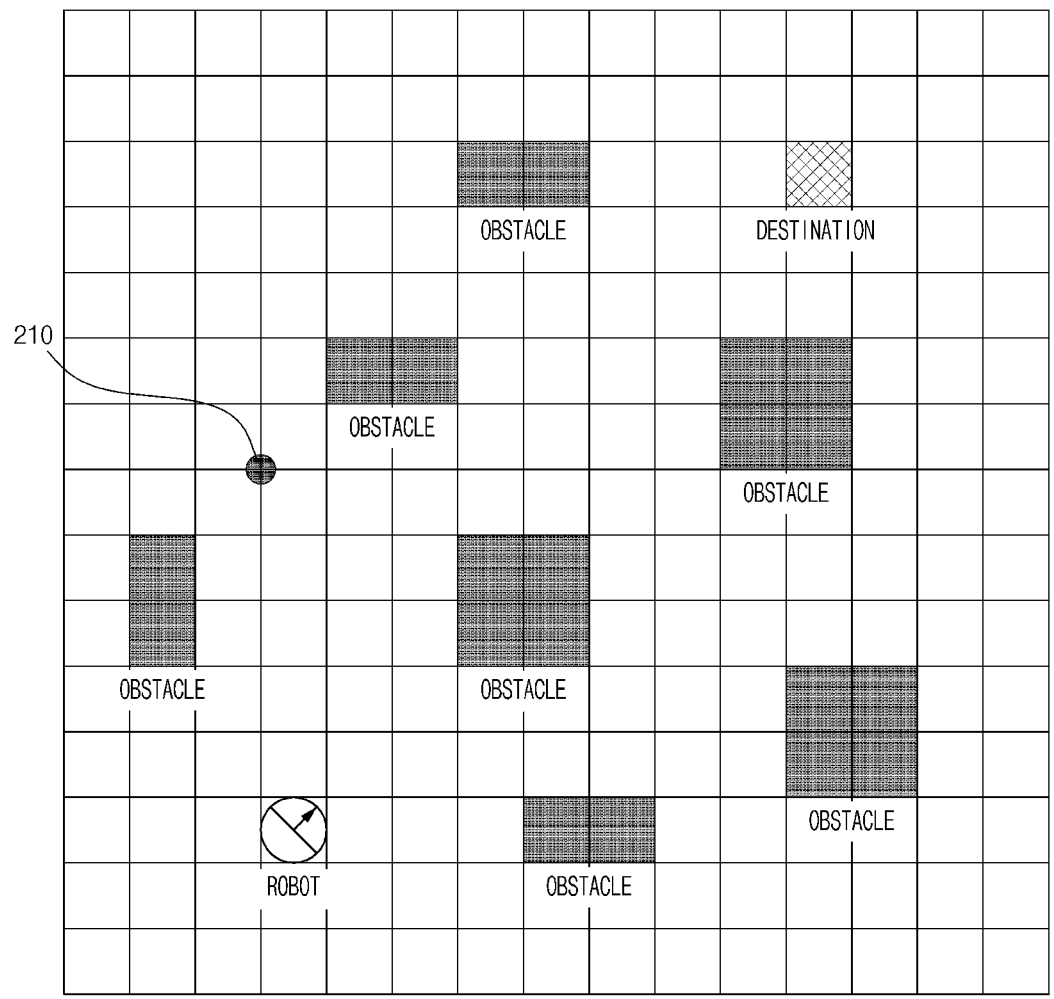
FIG. 2 is a diagram illustrating an operation of a sampler provided in a path planning apparatus of a robot, according to an embodiment of the present disclosure.

FIG. 2 is a diagram illustrating an operation of a sampler provided in a path planning apparatus of a robot, according to an embodiment of the present disclosure.

As illustrated in FIG. 2, the sampler 31 provided in the path planning apparatus of the robot according to an embodiment of the present disclosure may sample nodes that do not overlap the obstacles on the electronic map on which the current location of the robot and the destination are displayed based on the electronic map stored in the memory 10 and the obstacle information detected by the sensing device 20. That is, the sampler 31 may sample arbitrary nodes that do not overlap an obstacle area on the electronic map. A node sampled in this way is indicated by a reference number 210. The sampler 31 may perform a sampling process under the control of the tree connection determinator 34, and for example, one node may be sampled during one sampling.

Figure 3:
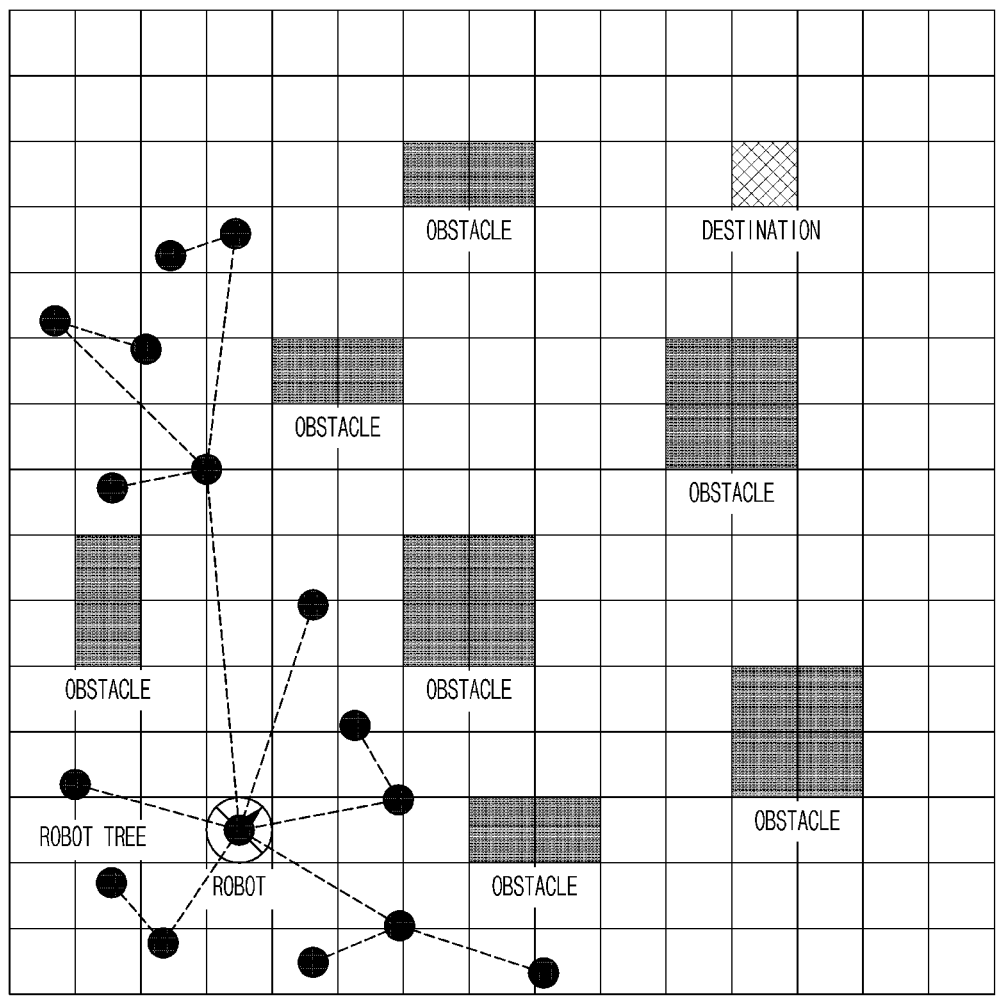
FIG. 3 is a diagram illustrating an operation of a robot tree generator provided in a path planning apparatus of a robot, according to an embodiment of the present disclosure.

FIG. 3 is a diagram illustrating an operation of a robot tree generator provided in a path planning apparatus of a robot, according to an embodiment of the present disclosure.

As illustrated in FIG. 3, the robot tree generator 32 provided in the path planning apparatus of the robot according to an embodiment of the present disclosure may generate a robot tree using the current location of the robot as a root node, by using the nodes sampled by the sampler 31. In this case, the robot tree generator 32 may generate the robot tree by selectively using the nodes sampled by the sampler 31. That is, the robot tree generator 32 may generate the robot tree by using, among the nodes sampled by the sampler 31, nodes that do not collide with the obstacles while the robot is moving. As an example, when a straight line (a dotted line) connecting the latest node sampled by the sampler 31 to an arbitrary node on the robot tree overlaps the obstacle area, the robot tree generator 32 may delete the latest node, as it is a node unnecessary for generation of the robot tree.

Figure 4:
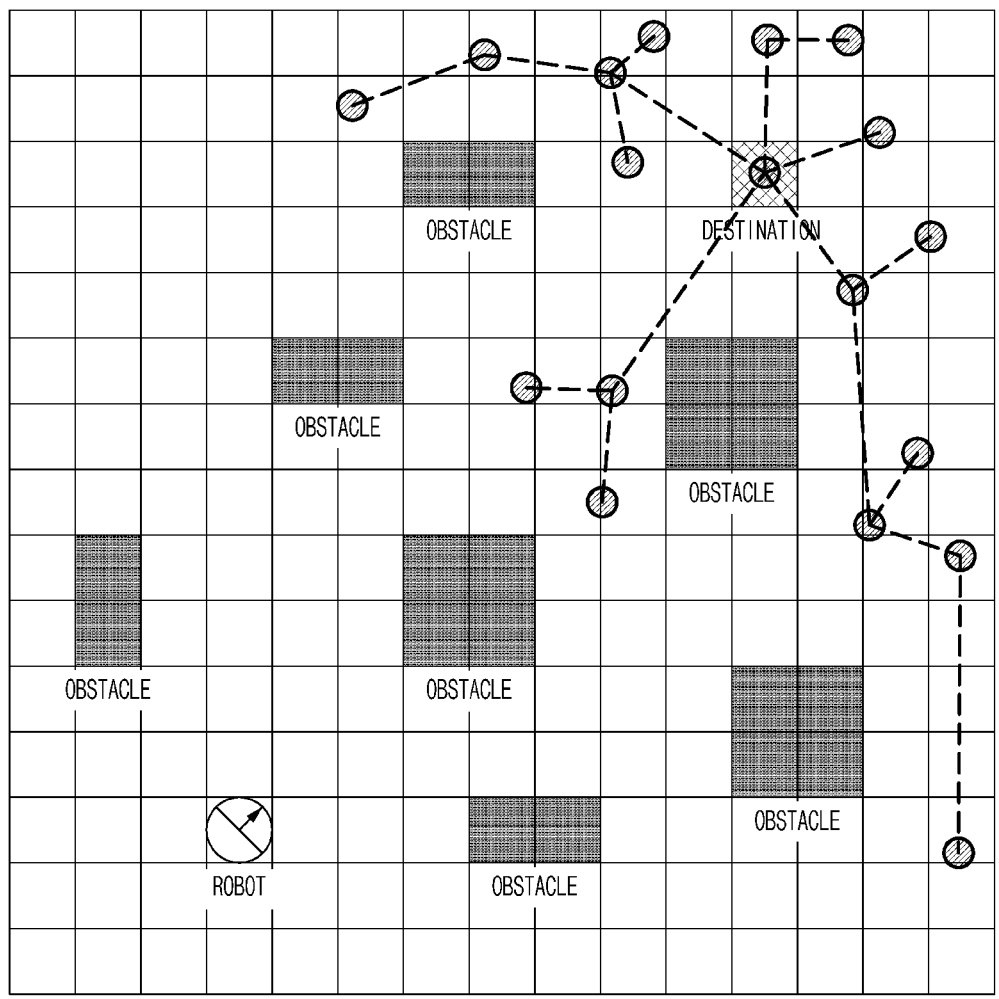
FIG. 4 is a diagram illustrating an operation of a destination tree generator provided in a path planning apparatus of a robot, according to an embodiment of the present disclosure.

FIG. 4 is a diagram illustrating an operation of a destination tree generator provided in a path planning apparatus of a robot, according to an embodiment of the present disclosure.

As illustrated in FIG. 4, the destination tree generator 33 provided in the path planning apparatus of the robot according to an embodiment of the present disclosure may generate a destination tree using the current location of the destination as a root node, by using the nodes sampled by the sampler 31. In this case, the destination tree generator 33 may generate the destination tree by selectively using the nodes sampled by the sampler 31. That is, the robot tree generator 32 may generate the destination tree by using, among the nodes sampled by the sampler 31, nodes that do not collide with the obstacles while the robot is moving. As an example, when a straight line (a dotted line) connecting the latest node sampled by the sampler 31 to an arbitrary node on the destination tree overlaps the obstacle area, the destination tree generator 33 may delete the latest node, as it is a node unnecessary for generation of the destination tree.

Figure 5:
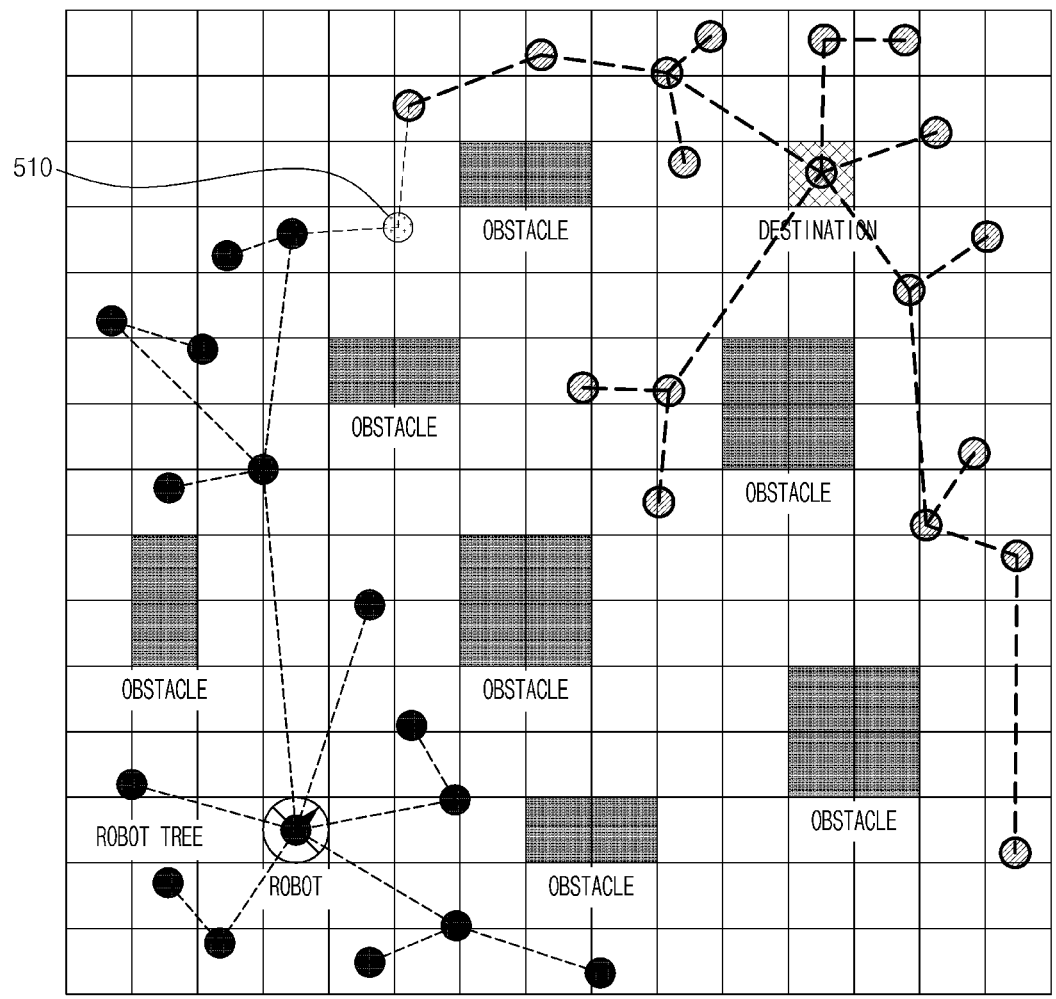
FIG. 5 is a diagram illustrating an operation of a tree connection determination provided in a path planning apparatus of a robot, according to an embodiment of the present disclosure.

FIG. 5 is a diagram illustrating an operation of a tree connection determinator provided in a path planning apparatus of a robot, according to an embodiment of the present disclosure.

As illustrated in FIG. 5, the tree connection determinator 34 provided in the path planning apparatus of the robot according to an embodiment of the present disclosure may monitor the robot tree (a generation process of the robot tree) generated by the robot tree generator 32 and the destination tree (a generation process of the destination tree) generated by the destination tree generator 33. That is, the tree connection determinator 34 may periodically determine whether the robot tree generated by the robot tree generator 32 and the destination tree generated by the destination tree generator 33 are interconnected.

In FIG. 5, the robot tree generated by the robot tree generator 32 and the destination tree generated by the destination tree generator 33 are connected to each other by a node 510 sampled by the sampler 31. In this case, the tree connection determinator 34 may determine that the robot tree and the destination tree are connected to each other by the node 510. In this case, the node 510 is the node most recently sampled by the sampler 31. In addition, the node 510 is a node (a valid node for the robot tree) that the robot tree generator 32 may use to generate the robot tree, and is a node (a valid node for the destination tree) that the destination tree generator 33 may use to generate the destination tree.

The tree connection determinator 34 may request sampling of an arbitrary node to the sampler 31 until a common node capable of connecting the robot tree generated by the robot tree generator 32 to the destination tree generated by the destination tree generator 33 is sampled. As an example, although the node 510 is a connection node 1*n* FIG. 5, the connection node 1*s* not necessarily limited to the 510 and may be sampled at another location (e.g., at the lower right of FIG. 5).

Figure 6:
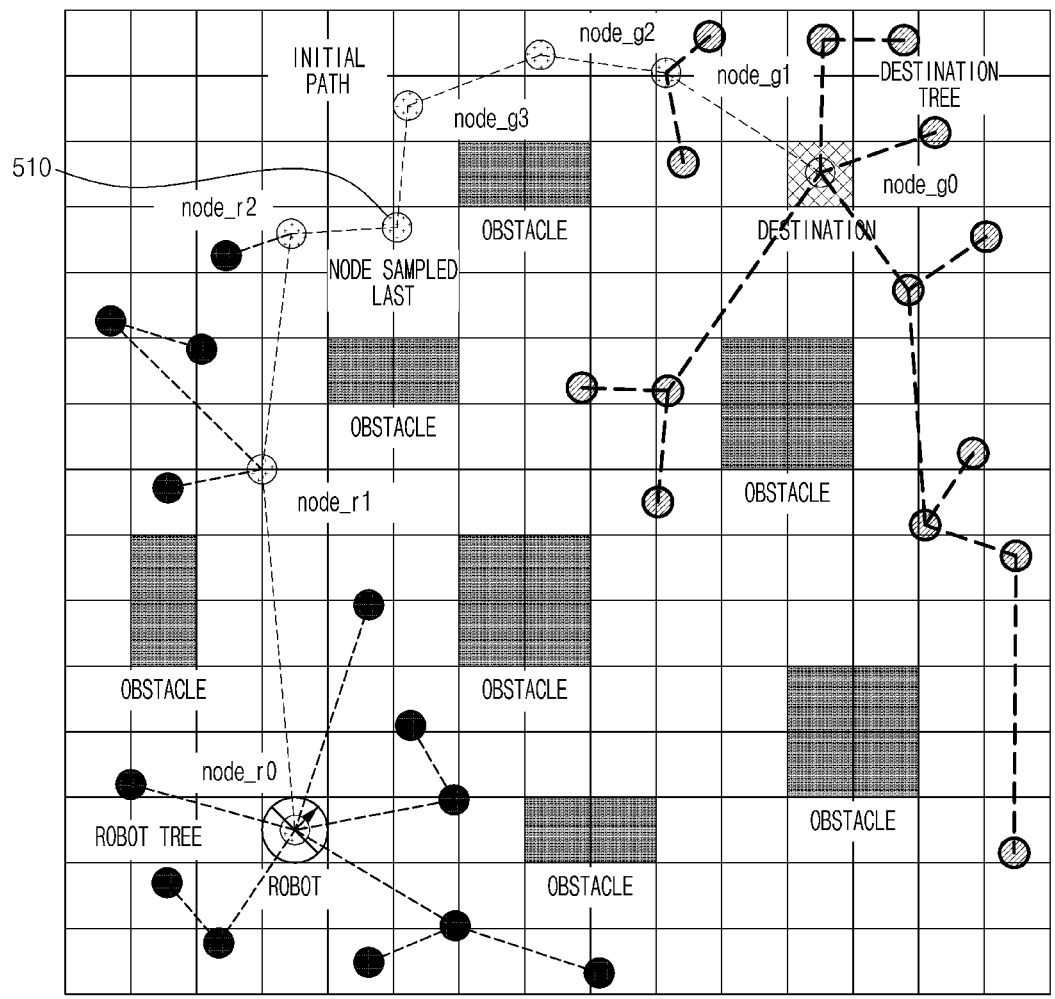
FIG. 6 is a diagram illustrating an operation of an initial path searcher provided in a path planning apparatus of a robot, according to an embodiment of the present disclosure.

FIG. 6 is a diagram illustrating an operation of an initial path searcher provided in a path planning apparatus of a robot, according to an embodiment of the present disclosure.

As illustrated in FIG. 6, the initial path searcher 35 provided in the path planning apparatus of a robot according to an embodiment of the present disclosure may search for an initial path from the interconnected robot tree and the destination tree. That is, the initial path searcher 35 may search for the initial path from the current location of the robot to the destination based on the interconnected robot tree and the destination tree.

For example, the initial path searcher 35 searches for 'node_r2' connected to the last node 510 based on the node 510 sampled last by the sampler 31, searches for 'node_r1' connected to the 'node_r2', and searches for 'node_r0' connected to the 'node_r1' to search the path on the robot tree. In addition, the initial path searcher 35 searches for 'node_g3' connected to the last node 510 based on the last node 510, searches for 'node_g2' connected to the 'node_g3', searches for 'node_g1' connected to the 'node_g2', and searches for 'node_g0' connected to the 'node_g1' to search the path on the destination tree. Thereafter, the initial path searcher 35 may search for the initial path of the robot by connecting the path on the robot tree to the path on the destination tree. In this case, the initial path of the robot becomes 'node_r0→node_r1→node_r2→last node 510→node_g3→node_g2→node_g1→node_g0'.

Hereinafter, the operation of the path optimizer 36 among the detailed configurations of the controller 30 will be described in detail with reference to FIGS. 7A to 7F.

FIGS. 7A to 7F are diagrams illustrating a process of optimizing an initial path by a path optimizer provided in a path planning apparatus of a robot, according to an embodiment of the present disclosure.

Figure 7A:
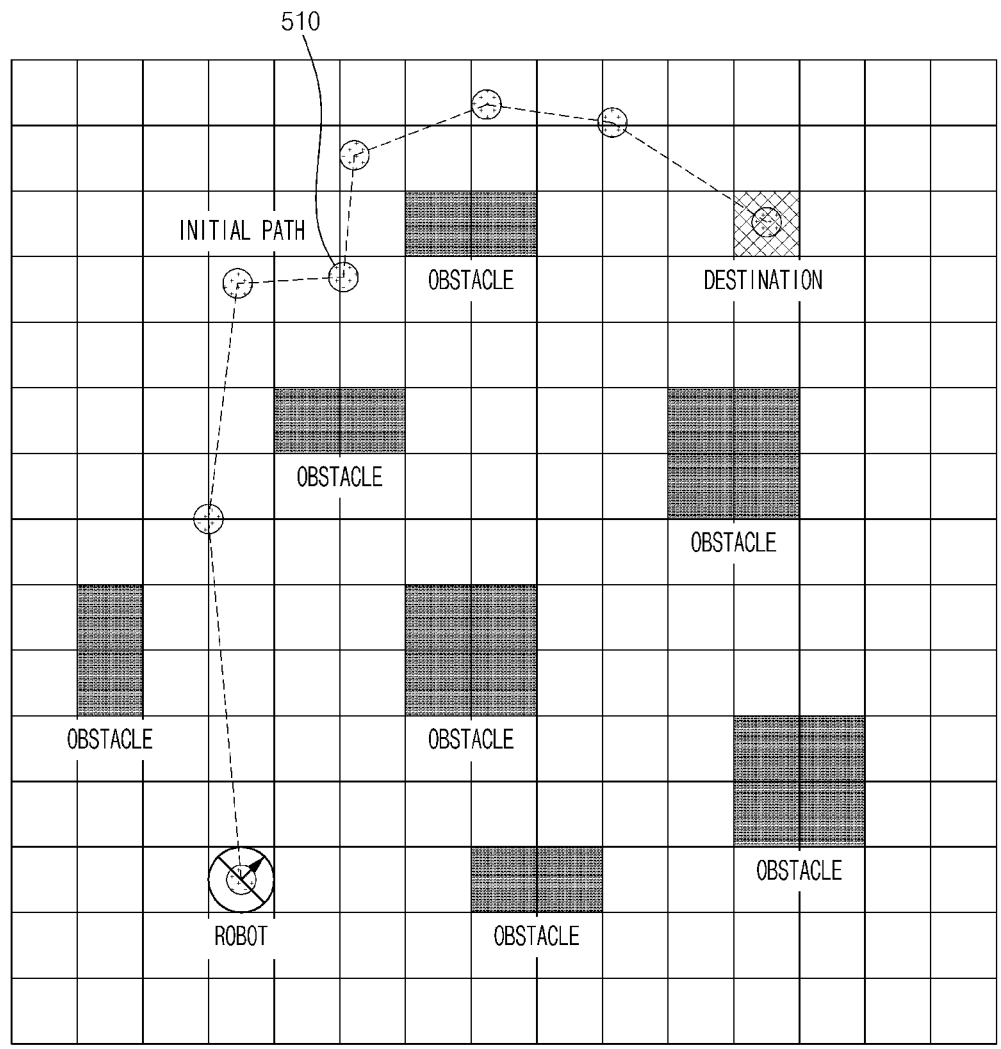
FIGS. 7A to 7F are diagrams illustrating a process of optimizing an initial path by a path optimizer provided in a path planning apparatus of a robot, according to an embodiment of the present disclosure.

In FIG. 7A, a dotted line connecting each node between the node indicating the current location of the robot and the node indicating the destination indicates the initial path from the current location of the robot to the destination, searched for by the initial path searcher 35.

Figure 7B:
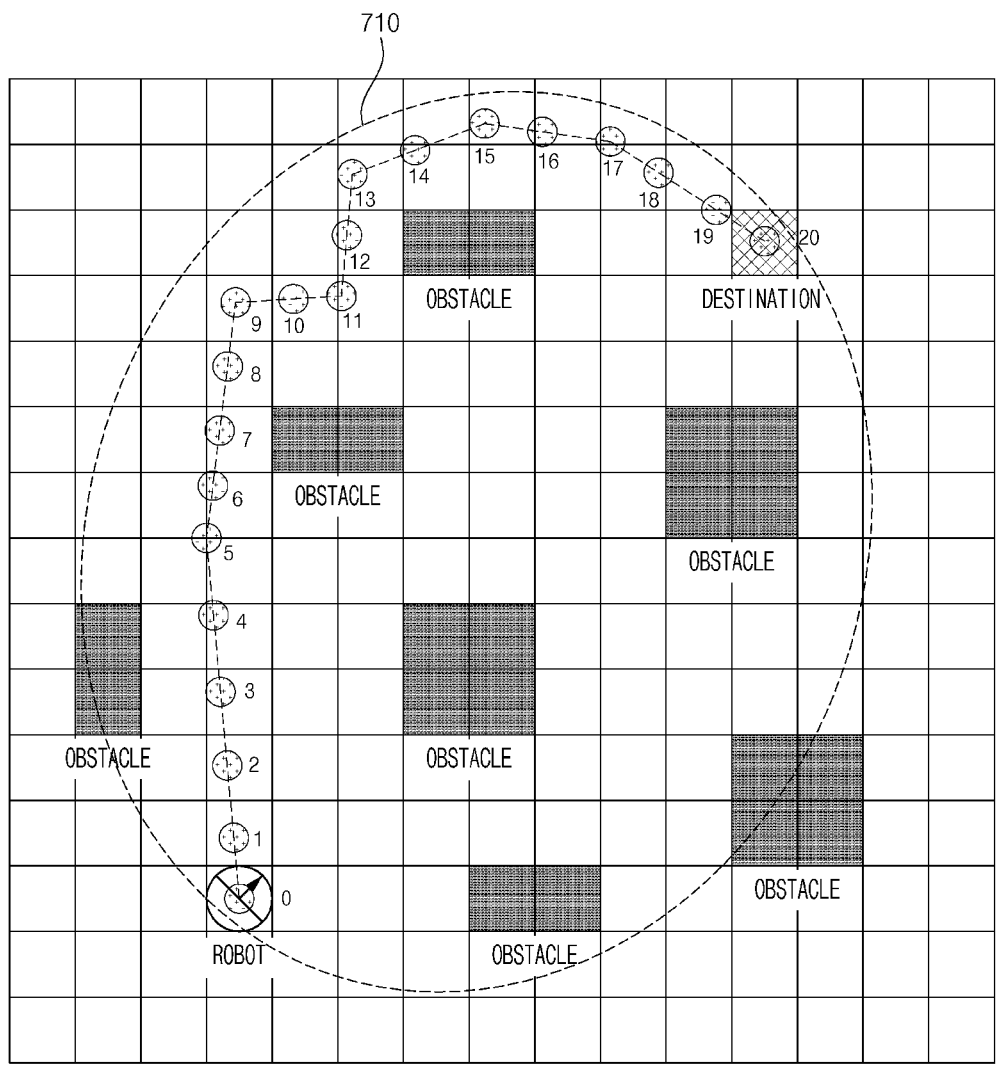

First, the path optimizer 36 interpolates the initial path as illustrated in FIG. 7A at specific intervals, and may configure a total of 21 nodes having a node (start node) indicating the current location of the robot as number 0 and a node (last node) indicating the destination as number 20 as illustrated in FIG. 7B. In this case, 8 nodes configuring the initial path may be maintained, and in particular, a total of 21 nodes maintain a uniform interval.

Thereafter, the path optimizer 36 may designate 21 nodes included in the initial path as segment_0 710 as illustrated in FIG. 7B.

Figure 7C:
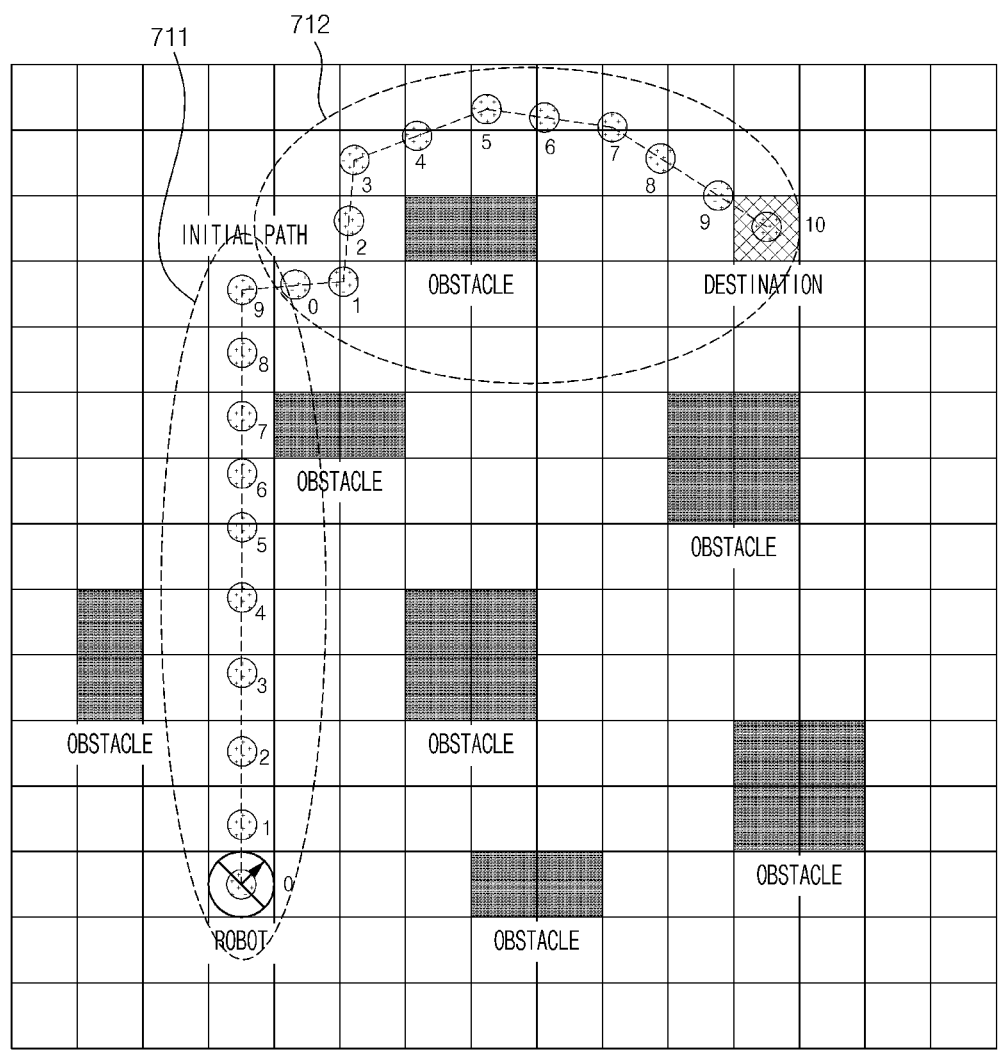

Thereafter, the path optimizer 36 may divide the segment_0 710 into segment_1 711 and segment_2 712 as illustrated in FIG. 7C. That is, the path optimizer 36 performs a process of sequentially connecting from node 20 to node 1 up to node 19, with node 0 as the starting point, with respect to 21 nodes included in the segment_0 710, and then detects two nodes with the earliest order among the two nodes where the lines connecting the two nodes do not overlap the obstacles.

Thereafter, the path optimizer 36 designates the two nodes with the earliest order and all nodes between the two nodes as the segment_1 711, and designates the remaining nodes as the segment_2 712.

For better understanding, the path optimizer 36 may draw a first connection line between node 0 and node 20 and may determine whether the first connection line overlaps an obstacle. In this case, as may be seen from FIG. 7B, the first connection line overlaps the obstacle. Accordingly, the path optimizer 36 may draw a second connection line between node 0 and node 19 and may determine whether the second connection line overlaps the obstacle. As in the above description, the second connection line also overlaps the obstacle. For reference, a designer may adjust the thickness of the connection line such that the robot does not collide with the obstacle while the robot is moving.

Thereafter, the path optimizer 36 performs the above process from node 0 and node 18, node 0 and node 17, node 0 and node 16, . . . , up to node 0 and node 1. In this case, a connection line between node 0 and node 9 becomes the first connection line that does not overlap the obstacles.

Accordingly, the path optimizer 36 designates nodes 0 to 9 as the segment_1 711, and designates nodes 10 to 20 as the segment_2 712. In this case, nodes included in the segment_2 712 may be sequentially re-numbered from node 0 to node 10 as illustrated in FIG. 7C.

When there is no connection line that does not overlap obstacles even though all of the above processes are performed up to node 0 and node 1, the above process is performed in the order of node 1 and node 20, node 1 and node 19, node 1 and node 18, . . . , node 1 and node 2. This process may be performed up to node 19 and node 20.

Next, the path optimizer 36 may perform a first optimization process on the segment_1 711 and the segment_2 712. That is, when the path optimizer 36 connects the nodes included in the segment_1 711 and the nodes included in the segment_2 712 to each other based on the segment_1 711, the path optimizer 36 connects the nodes included in the segment_1 711 in ascending order to the nodes included in the segment_2 712 in descending order, respectively, to detect the two nodes (the first node of the segment_1 711 and the second node of the segment_2 712) with the earliest order among the two nodes where the lines connecting the two nodes do not overlap the obstacle.

Thereafter, the path optimizer 36 may designate from node 0 to the first node as segment_3 713, and may interpolate a connection line from the first node to the second node at specific intervals to generate a plurality of nodes. In addition, the path optimizer 36 may designate the plurality of generated nodes and the second node as segment_4 714, and may designate the remaining nodes as segment_5 715. In this case, nodes in the segment_4 714 may be sequentially re-numbered, and also nodes in the segment_5 715 may be re-numbered sequentially.

For better understanding, the path optimizer 36 may determine whether the first connection line between node 0 and node 10 of the segment_2 712 overlaps the obstacle, starting with node 0 of the segment_1 711. In this case, as may be seen from FIG. 7C, the first connection line overlaps the obstacles. Accordingly, the path optimizer 36 may draw a second connection line between node 0 of the segment_1 711 and node 9 of the segment_2 712, and may determine whether the second connection line overlaps the obstacle. As in the above description, the second connection line also overlaps the obstacles. In this case, as may be seen from FIG. 7C, the connection lines between node 0 of the segment_1 711 and each node of the segment_2 712 all overlap the obstacles.

Accordingly, the path optimizer 36 may perform the above process again based on node 1 of the segment_1 711. That is, the path optimizer 36 may determine whether connection lines overlap the obstacles in order of node 1 of the segment_1 711 and node 10 of the segment_2 712, node 1 of the segment_1 711 and node 9 of the segment_2 712, node 1 of the segment_1 711 and node 8 of the segment_2 712, node 1 of the segment_1 711 and node 7 of the segment_2 712, node 1 of the segment_1 711 and node 6 of the segment_2 712, node 1 of the segment_1 711 and node 5 of the segment_2 712, node 1 of the segment_1 711 and node 4 of the segment_2 712, node 1 of the segment_1 711 and node 3 of the segment_2 712, node 1 of the segment_1 711 and node 2 of the segment_2 712, node 1 of the segment_1 711 and node 1 of the segment_2 712, and node 1 of the segment_1 711 and node 0 of the segment_2 712. In this case, as may be seen from FIG. 7C, the connection lines between node 1 of the segment_1 711 and each node of the segment_2 712 all overlap the obstacles.

Accordingly, the path optimizer 36 may perform the above process again based on node 2 of the segment_1 711. In this case, the connection line between node 2 of the segment_1 711 and node 8 of the segment_2 712 becomes the first connection line that does not overlap the obstacles.

Figure 7D:
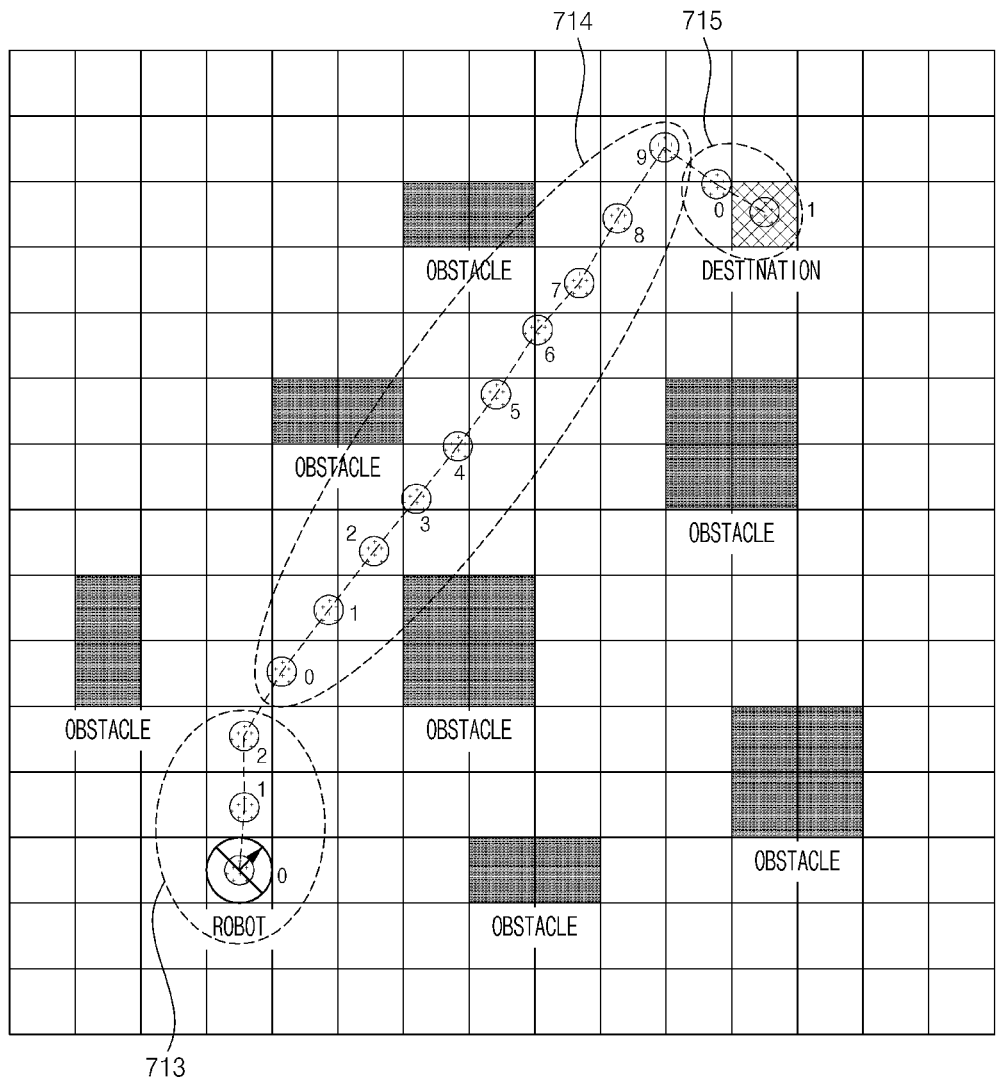

Accordingly, the path optimizer 36 may detect node 2 of the segment_1 711 and node 8 of the segment_2 712, and may interpolate the connection line between node 2 of the segment_1 711 and node 8 of the segment_2 712 at specific intervals to generate a plurality of nodes (from node 0 to node 8 as illustrated in FIG. 7D). Thereafter, the path optimizer 36 may designate nodes 0 to 2 of the segment_1 711 as the segment_3 713, may designate nodes 0 to 8 generated by the interpolation and node 8 of the segment_2 712 as the segment_4 714, and may designate nodes 9 and 10 of the segment_2 712 as the segment_5 715. In this case, node 8 of the segment_2 712 designated as the segment_4 714 may be re-numbered as node 9, and nodes 9 and 10 designated as the segment_5 715 may be re-numbered as node 0 and node 1, respectively. That is, as illustrated in FIG. 7D, the segment_3 713 includes nodes 0 to 2, the segment_4 714 includes nodes 0 to 9, and the segment_5 715 includes nodes 0 to node 1.

As a result, the path optimizer 36 may first optimize the initial path composed of the segment_1 711 and the segment_2 712 as illustrated in FIG. 7C into a path composed of the segment_3 713, the segment_4 714, and segment_5 715 as illustrated in FIG. 7D. In this case, comparing FIGS. 7C and 7D, it may be seen that the path from the current location of the robot to the destination is clearly shortened.

Next, the path optimizer 36 may perform the secondary optimization process with respect to the segment_3 713, the segment_4 714, and the segment_5 715 as illustrated in FIG. 7D. That is, when the path optimizer 36 connects the nodes included in the segment_3 713 to the nodes included in the segment_4 714 based on the segment_3 713, the path optimizer 36 may connect the nodes included in the segment_3 713 in ascending order to the nodes included in the segment_4 714 in descending order, respectively, to detect two nodes (node 0 of the segment_3 713 and node 2 of the segment_4 714 in FIG. 7) with the earliest order among the two nodes where the lines connecting the two nodes do not overlap the obstacles.

Figure 7E:
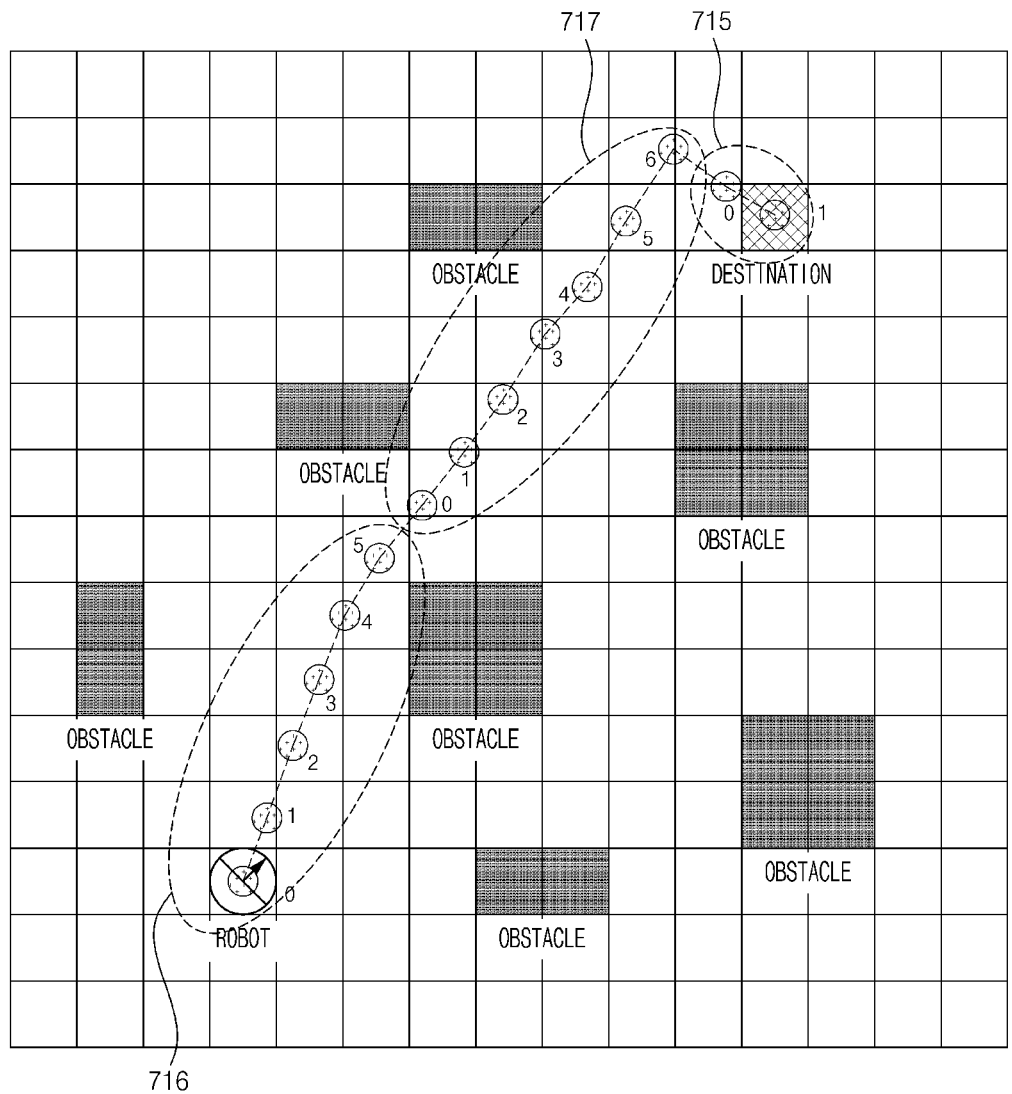

Accordingly, the path optimizer 36 interpolates the connection line between node 0 of the segment_3 713 and node 2 of the segment_4 714 at specific intervals to generate node 1, node 2, node 3, and node 4, as illustrated in FIG. 7E.

Thereafter, the path optimizer 36 designates node 0 of the segment_3 713, node 2 of segment_4 714, and the generated node 1, node 2, node 3, and node 4 as segment_6 716. In this case, as illustrated in FIG. 7E, node 2 of the segment_4 714 designated as the segment_6 716 may be re-numbered as node 5.

In addition, the path optimizer 36 sequentially re-numbers nodes 3 to 9 in the segment_4 714 into nodes 0 to 6, and designates the re-numbered nodes 0 to 6 as segment_7 717.

Next, the path optimizer 36 may perform the third optimization process with respect to the segment_6 716, the segment_7 717, and the segment_5 715 as illustrated in FIG. 7E. That is, when the path optimizer 36 connects the nodes included in the segment_6 716 to the nodes included in the segment_7 717 based on the segment_6 716, the path optimizer 36 connects the nodes included in the segment_6 716 in ascending order to the nodes included in segment_7 717 in descending order, respectively, to detect two nodes with the earliest order among the two nodes where the lines connecting the two nodes do not overlap the obstacles. In this case, as illustrated in FIG. 7E, there is no case where the lines connecting the two nodes do not overlap the obstacles. Accordingly, the path optimizer 36 may determine that optimization is completed between the segment_6 716 and the segment_7 717.

That is, when the path optimizer 36 connects the nodes included in the segment_7 717 to the nodes included in the segment_5 715 based on the segment_7 717, the path optimizer 36 may connect the nodes included in the segment_7 717 in ascending order to the nodes included in the segment_5 715 in descending order, respectively, to detect two nodes (node 0 of the segment_7 717 and node 1 of the segment_5 715 in FIG. 7E) with the earliest order among the two nodes where the lines connecting the two nodes do not overlap the obstacles.

Figure 7F:
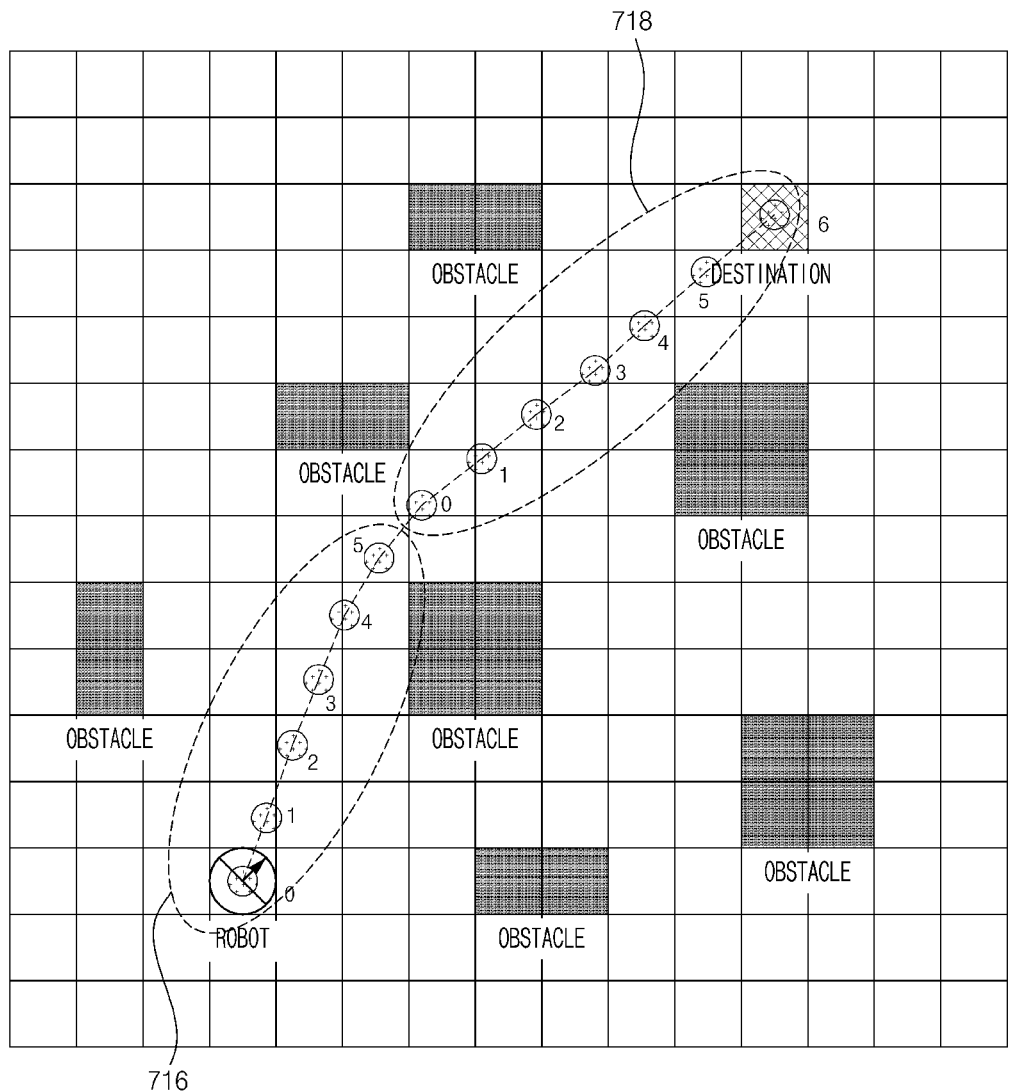

Accordingly, the path optimizer 36 interpolates the connection line between node 0 of the segment_7 717 and node 1 of the segment_5 715 at specific intervals to generate node 1, node 2, node 3, node 4, and node 5, as illustrated in FIG. 7F.

Thereafter, the path optimizer 36 designates node 0 of the segment_7 717, node 1 of segment_5 715, and the generated node 1, node 2, node 3, node 4, and node 5 as segment_8 718. In this case, as illustrated in FIG. 7F, node 1 of the segment_5 715 designated as the segment_8 718 may be re-numbered as node 6. Accordingly, the segment_8 718 may include nodes 0 to 6.

Next, the path optimizer 36 may perform a fourth optimization process with respect to the segment_6 716 and the segment_8 718 as illustrated in FIG. 7F. That is, when the path optimizer 36 connects the nodes included in the segment_6 716 to the nodes included in the segment_8 718 based on the segment_6 716, the path optimizer 36 connects the nodes included in the segment_6 716 in ascending order to the nodes included in segment_8 718 in descending order, respectively, to detect two nodes with the earliest order among the two nodes where the lines connecting the two nodes do not overlap the obstacles. In this case, as illustrated in FIG. 7F, since there is no case where the line connecting the two nodes do not overlap to the obstacles, the path optimizer 36 finally ends the optimization process of the initial path in a third step.

As a result, the final result of the path optimizer 36 optimizing the initial path as illustrated in FIG. 7A is illustrated in FIG. 7F. As illustrated in FIG. 7F, the optimal path has the shortest distance from the current location of the robot to the destination.

Figure 8:
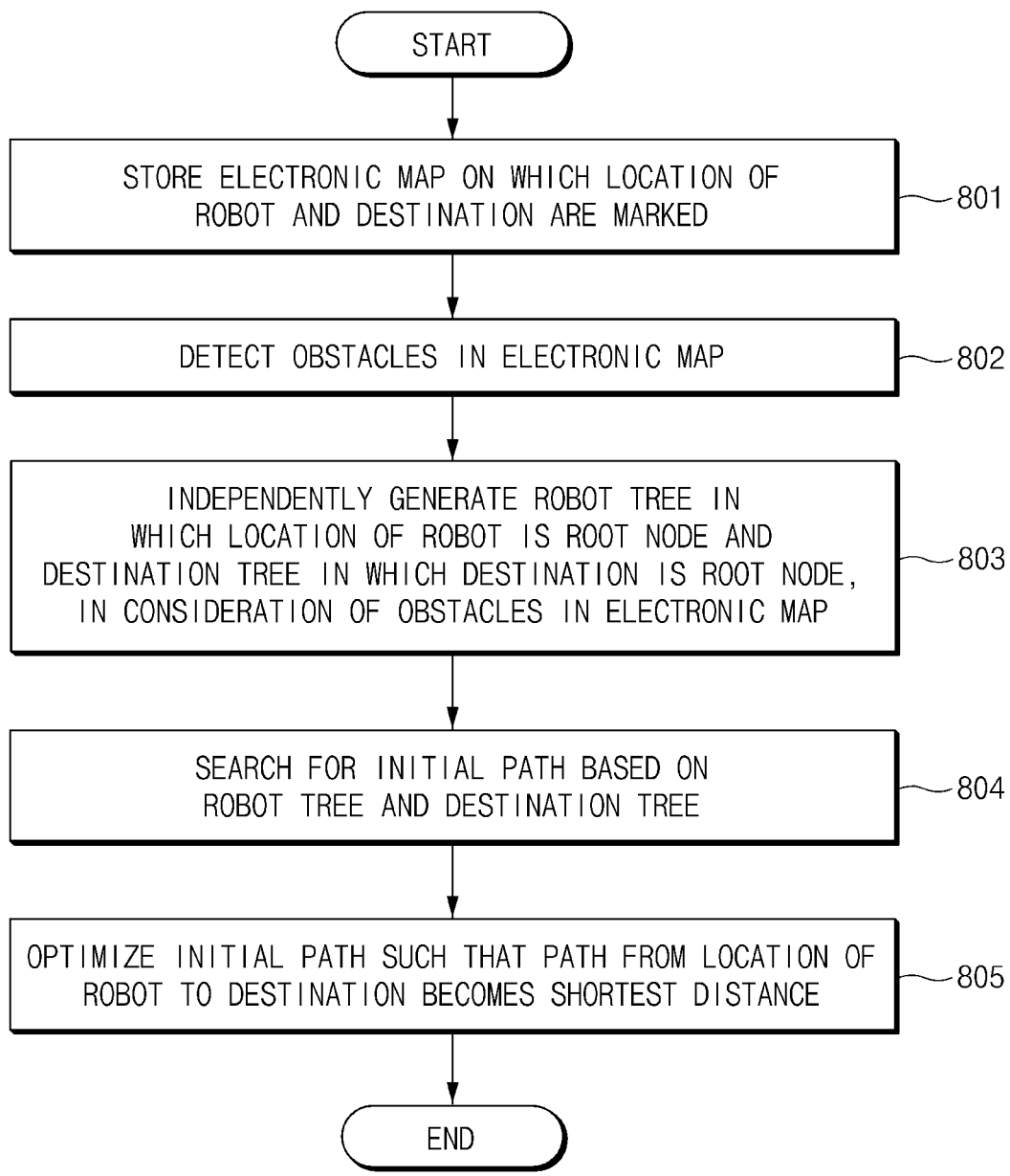
FIG. 8 is a flowchart for describing a path planning method of a robot, according to an embodiment of the present disclosure.

FIG. 8 is a flowchart for describing a path planning method of a robot, according to an embodiment of the present disclosure.

First, the memory 10 stores the electronic map on which the location of a robot and a destination are marked (801).

Thereafter, the sensing device 20 detects obstacles in the electronic map (802).

Thereafter, the controller 30 independently generates a robot tree in which the location of the robot is a root node and a destination tree in which the destination is a root node, in consideration of the obstacles in the electronic map (803).

Thereafter, the controller 30 searches for an initial path based on the robot tree and the destination tree (804).

Thereafter, the controller 30 optimizes the initial path such that the path from the location of the robot to the destination becomes the shortest distance (805).

Figure 9:
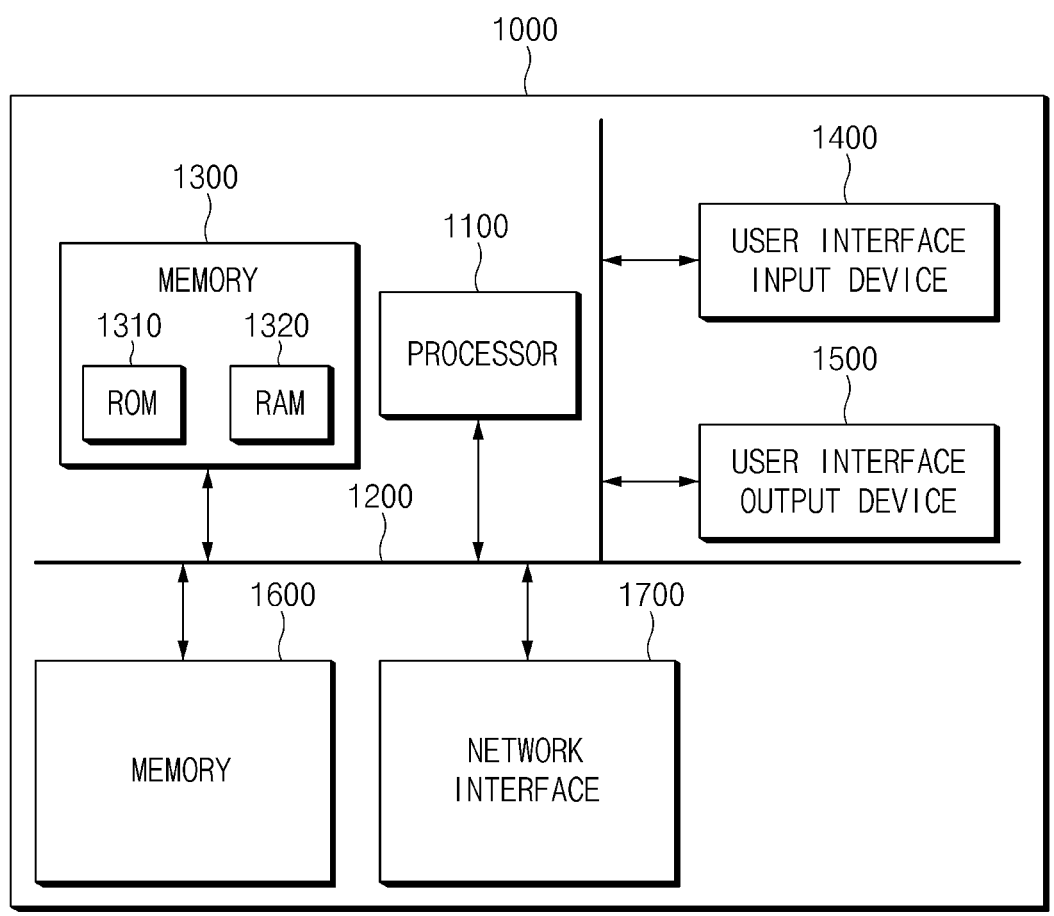
FIG. 9 is a block diagram illustrating a computing system for executing a path planning method of a robot, according to an embodiment of the present disclosure.

FIG. 9 is a block diagram illustrating a computing system for executing a path planning method of a robot, according to an embodiment of the present disclosure.

Referring to FIG. 9, the above-described path planning method of the robot, according to an embodiment of the present disclosure may be implemented through a computing system. A computing system 1000 may include at least one processor 1100, a memory 1300, a user interface input device 1400, a user interface output device 1500, a memory (i.e., a storage) 1600, and a network interface 1700, which are connected with each other through a system bus 1200.

The processor 1100 may be a central processing unit (CPU) or a semiconductor device that processes instructions stored in the memory 1300 and/or the memory 1600. Each of the memory 1300 and the memory 1600 may include various types of volatile or nonvolatile storage media. For example, the memory 1300 may include a read only memory (ROM) 1310 and a random access memory (RAM) 1320.

Accordingly, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the memory 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium as an example may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an embodiment of the present disclosure, a path planning apparatus and method for a robot may not only quickly search for an initial path, but also quickly optimize the initial path by independently generating a robot tree in which the location of the robot is a root node and a destination tree in which the destination is a root node, searching for the initial path based on the robot tree and the destination tree, and optimizing the initial path such that a path from the location of the robot to the destination becomes a shortest distance.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclosure, but are provided only for illustrative purposes. The scope of protection of the present disclosure should be construed by the attached claims, and all equivalents thereof should be construed as being included within the scope of the present disclosure.

What is claimed is:

1. A path planning apparatus comprising:
   a processor; and
   a non-transitory storage medium containing program instructions that, when executed by the processor, causes the path planning apparatus to:
      detect obstacles in an electronic map stored in a memory, wherein a location of a robot and a destination are marked on the electronic map,
      independently generate a robot tree in which the location of the robot is a first root node and a destination tree in which the destination is a second root node, in consideration of the obstacles in the electronic map,
      search for an initial path based on the robot tree and the destination tree, and
      optimize the initial path such that a final path from the location of the robot to the destination has a shortest distance.

2. The apparatus of claim 1, wherein the program instructions, when executed by the processor, further cause the path planning apparatus to sample nodes that do not overlap the obstacles in the electronic map.

3. The apparatus of claim 2, wherein the program instructions, when executed by the processor, further cause the path planning apparatus to generate the robot tree by using a node that prevents a collision with the obstacles while the robot is moving.

4. The apparatus of claim 2, wherein the program instructions, when executed by the processor, further cause the path planning apparatus to generate the destination tree by using a node that prevents a collision with the obstacles while the robot is moving.

5. The apparatus of claim 2, wherein the program instructions, when executed by the processor, further cause the path planning apparatus to sample the nodes until a common node connecting the robot tree to the destination tree is sampled.

6. The apparatus of claim 1, wherein the program instructions, when executed by the processor, further cause the path planning apparatus to search for the initial path from the location of the robot to the destination when the robot tree is connected to the destination tree.

7. The apparatus of claim 1, wherein the program instructions, when executed by the processor, further cause the path planning apparatus to:
   divide the initial path in units of segments after interpolating the initial path at specific intervals; and
   optimize the initial path based on a relationship between nodes between each segment and the obstacles.

8. The apparatus of claim 7, wherein the program instructions, when executed by the processor, further cause the path planning apparatus to optimize the initial path until all lines connecting the nodes between each segment overlap the obstacles.

9. The apparatus of claim 7, wherein the program instructions, when executed by the processor, further cause the path planning apparatus to:
   generate a plurality of nodes by interpolating the initial path at the specific intervals;
   detect two nodes with an earliest order among pairs of nodes in which lines connecting the two nodes do not overlap the obstacles by performing a process of sequentially connecting from a destination node to a next node of a robot node with the robot node as a starting point to a previous node of the destination node; and
   designate the two nodes with the earliest order and all nodes between the two nodes as a first segment and designate remaining nodes as a second segment.

10. The apparatus of claim 9, wherein the program instructions, when executed by the processor, further cause the path planning apparatus to:
    connect the nodes included in the first segment in ascending order to the nodes included in the second segment in descending order, respectively, when the nodes included in the first segment are connected to the nodes included in the second segment based on the first segment to detect a first node and a second node with an earliest order among pairs of nodes in which the line connecting the first node and the second node does not overlap the obstacles; and
    designate from a start node of the first segment to the first node as a third segment, designate from the first node to the second node as a fourth segment, designate from the second node to a last node as a fifth segment, sequentially number nodes in the fourth segment, and sequentially number nodes in the fifth segment.

11. A method comprising:
    detecting, by a processor, obstacles in an electronic map on which a location of a robot and a destination are marked;
    generating, by the processor, a robot tree in which the location of the robot is a root node, in consideration of the obstacles in the electronic map;
    generating, by the processor, a destination tree in which the destination is a root node in consideration of the obstacles in the electronic map, the robot tree and the destination tree being generated independently of each other;
    searching, by the processor, for an initial path based on the robot tree and the destination tree; and
    optimizing, by the processor, the initial path such that a final path from the location of the robot to the destination has a shortest distance.

12. The method of claim 11, wherein generating the robot tree and generating the destination tree comprise sampling, by the processor, nodes that do not overlap the obstacles in the electronic map.

13. The method of claim 12, wherein generating the robot tree comprises using, by the processor, a node that prevents a collision with the obstacles while the robot is moving.

14. The method of claim 12, wherein generating the destination tree comprises using, by the processor, a node that prevents a collision with the obstacles while the robot is moving.

15. The method of claim 12, wherein sampling the nodes comprises sampling, by the processor, a common node connecting the robot tree to the destination tree.

16. The method of claim 11, wherein searching for the initial path comprises searching, by the processor, for the initial path from the location of the robot to the destination when the robot tree is connected to the destination tree.

17. The method of claim 11, wherein optimizing the initial path comprises:
    dividing, by the processor, the initial path in units of segments after interpolating the initial path at specific intervals;
    optimizing, by the processor, the initial path based on a relationship between nodes between each segment and the obstacles; and
    completing, by the processor, optimizing the initial path when all lines connecting the nodes between each segment overlap the obstacles.

18. The method of claim 11, further comprising causing, by the processor, the robot to move to the destination along the final path.

19. A robot comprising:
- a robot body;
- a memory device;
- a processor, and
- a non-transitory storage medium containing program instructions that, when executed by the processor, causes the robot to:
  - detect obstacles in an electronic map stored in the memory device, wherein a location of the robot and a destination are marked on the electronic map,
  - independently generate a robot tree in which the location of the robot is a first root node and a destination tree in which the destination is a second root node, in consideration of the obstacles in the electronic map,
  - search for an initial path based on the robot tree and the destination tree, and
  - optimize the initial path such that a final path from the location of the robot to the destination is a path having a shortest distance.

20. The robot of claim 19, wherein the program instructions, when executed by the processor, further cause robot to:
- sample nodes that do not overlap the obstacles in the electronic map; and
- generate the destination tree using nodes that prevent a collision with the obstacles while the robot is moving.

* * * * *